March 8, 1932. W. W. MOHR 1,848,369
PLUG VALVE
Filed Oct. 20, 1930 3 Sheets-Sheet 1

INVENTOR.
WALTER W. MOHR.
BY Albert C. Bell
ATTORNEY.

March 8, 1932. W. W. MOHR 1,848,369
PLUG VALVE
Filed Oct. 20, 1930  3 Sheets-Sheet 2

INVENTOR
WALTER W. MOHR.

BY Albert C. Bill
ATTORNEY.

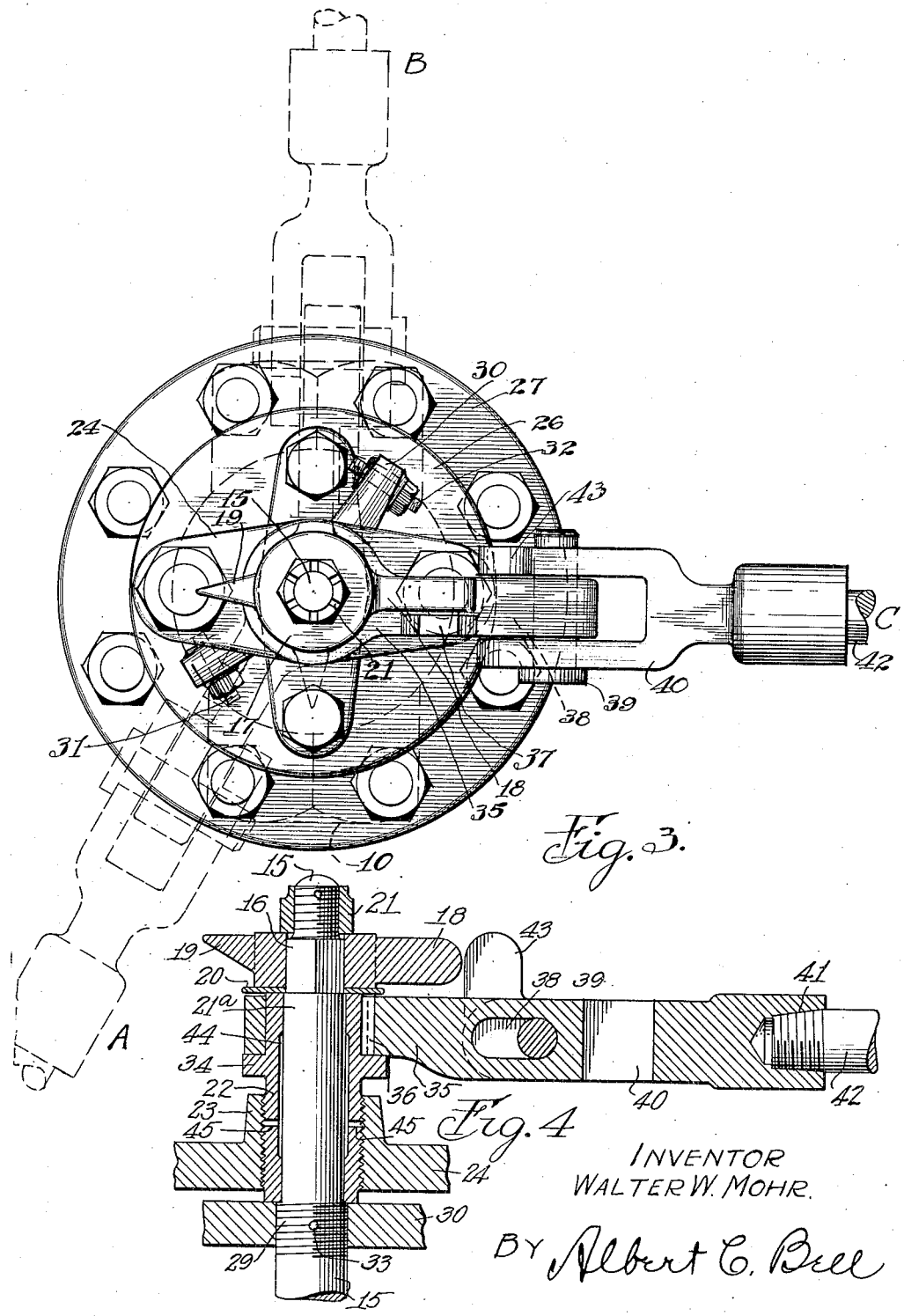

Patented Mar. 8, 1932

1,848,369

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

PLUG VALVE

Application filed October 20, 1930. Serial No. 489,783.

My invention relates to an improved construction of plug valve for controlling high fluid pressures where special means are required to seat and unseat the valve in connection with opening and closing it.

By my invention, I provide a construction by which an operating handle is mounted on a member movable angularly independently of the valve stem, the member being carried by a yoke to raise or lower the valve stem, depending upon the direction of movement of the handle, to unseat or seat the plug valve member as desired. The valve stem is provided with an operating arm for engagement with the handle mechanism, the handle mechanism consisting of members movable relatively to each other and carrying lugs for selective engagement with the stem arm, so that by proper operation of the handle, its continuous angular movement in one direction will first unseat the plug valve member and then move the valve member angularly from one of its flow controlling positions to the other, after which reversed angular movement of the handle mechanism will move the valve member securely into engagement with its seat, and that by continuous angular movement of the handle mechanism in the other direction, the valve member is moved from one of its flow controlling positions to the other with the valve member free from its seat, and thereafter the valve member is moved tightly into engagement with its seat. In this manner I avoid the necessity of having two operating handles or mechanisms and I further avoid complicated structures and operations which might make the operation of the valve uncertain and difficult.

Figure 1:
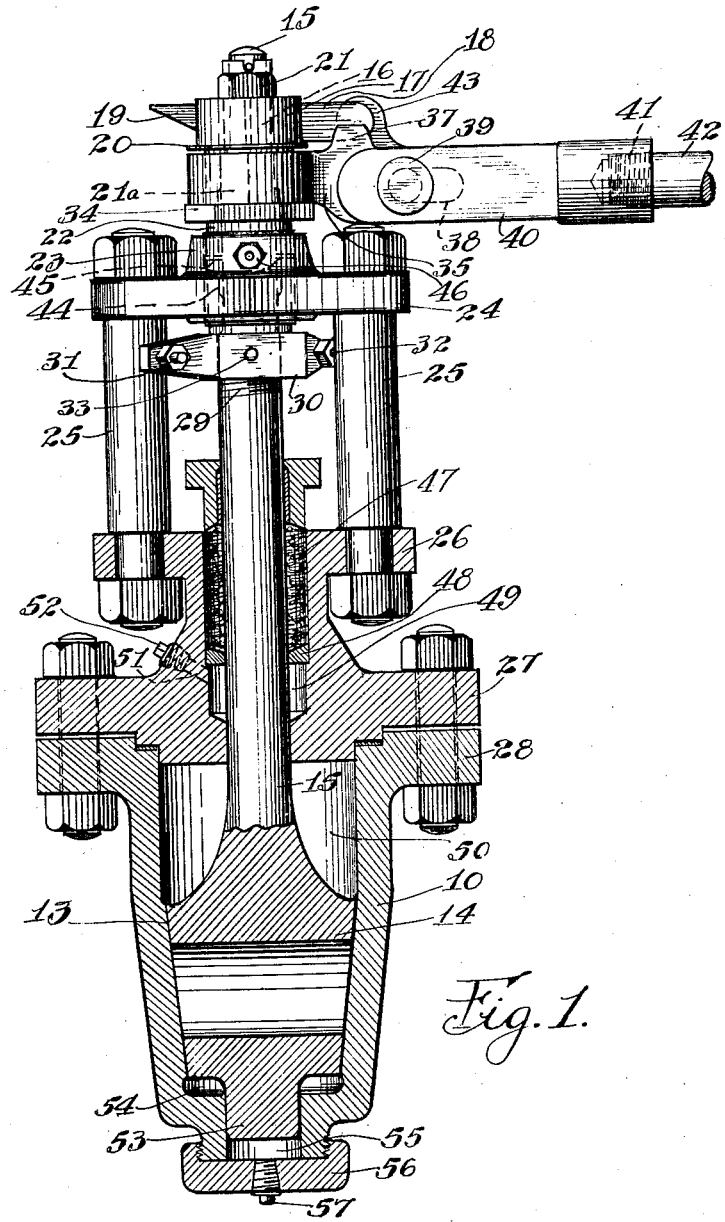
Figure 2:
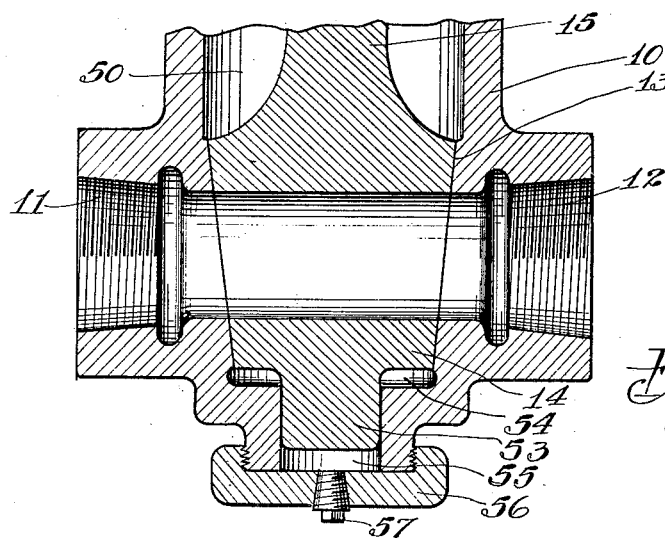
Figure 5:
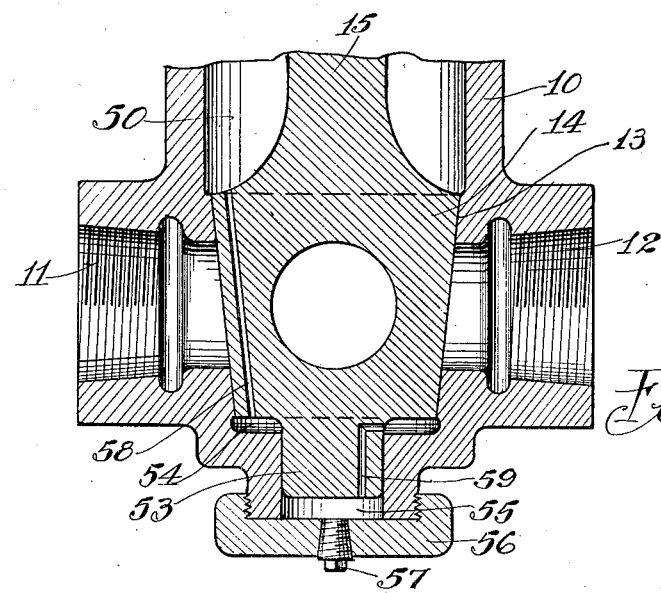

My invention will best be understood by reference to the accompanying drawings showing a preferred embodiment thereof in which Fig. 1 shows my valve construction partially in vertical, central, sectional view transversely of the flow path through the valve, and partially in front elevation, with the valve member in its closed position, Fig. 2 is a vertical, central, sectional view to an enlarged scale of the lower portion of the valve structure with the valve member in its open position, this view being taken longitudinally of the flow path through the valve, Fig. 3 is a top view of the parts shown in Fig. 1, Fig. 4 is a vertical, central, sectional view to an enlarged scale of the handle mechanism and associated parts, these parts being shown in Fig. 1 in front elevation, and Fig. 5 is a view similar to Fig. 2 with the valve member in its closed position.

Similar numerals refer to similar parts throughout the several views.

As shown in Fig. 1 my plug valve construction consists of a body 10, which, as shown in Fig. 2, is provided with fluid inlet and outlet connections 11 and 12 between which a tapered bore 13 is formed in the body to receive with a close fit the similarly tapered plug valve member 14. Above its seat, the valve member is of reduced diameter to constitute a valve stem 15 which extends upwardly to the top of the valve structure where said valve stem is of flat sided or square conformation as indicated at 16, to receive a collar 17 having an aperture fitting the valve stem, said collar having extending from it a stem operating arm 18 and an indicating extension 19. Below the collar 17, the valve stem carries a washer 20 and the collar 17 is pressed tightly against the washer and the latter is in turn held tightly against a shoulder at the end of the squared portion of the valve stem, by a castellated nut 21 threaded on the upper end of the valve stem and resting against the upper surface of the collar 17.

Below the washer 20, as more clearly shown in Fig. 4, the valve stem is cylindrical at 21a and receives with a free turning fit, a sleeve 22, the lower end of which is externally threaded and engages similar threads in a boss 23 extending upwardly from a yoke 24 supported by pillars 25, 25 from and above a bonnet 26. The lower end of the bonnet is provided with a flange 27 secured by suitable bolts to a flange 28 of the body 10.

The valve stem 15 is preferably threaded below the sleeve 22 as indicated at 29, to receive a similarly threaded stop arm 30 carrying at its ends threaded stop studs 31 and 32 for engagement with one of the pillars 25, 25 to limit the turning movement of the valve stem 15 in opening and closing the valve, the stop arm 30 being rigidly secured to the valve stem 15 in desired adjustment by means of a pin 33.

As a result of the construction described, angular movement of the arm 18 turns the valve stem and valve member to open and close the valve, and angular movement of the sleeve 22 relatively to the yoke 24 raises and lowers the sleeve to raise the valve member from its seat and press the valve member against its seat respectively. The sleeve 22 extends with slight clearance from the lower face of the washer 20 to the upper face of the stop arm 30, as a result of which upward movement of the sleeve to raise the valve member exerts an upward thrust on the washer 20 which is communicated to the collar 17 and thus to the nut 21 carried by the upper end of the valve stem, and downward movement of the sleeve 22 presses against the upper face of the stop arm 30 and produces a downward thrust on the valve stem and valve member which presses the valve member tightly against its seat.

Above the boss 23, the sleeve 22 is provided with a flat sided flange 34, to facilitate assembling the parts, above which the sleeve is cylindrical to receive a sleeve arm 35 which is rigidly keyed to the sleeve as indicated at 36, the upper surface of the sleeve arm being preferably slightly below the upper end of the sleeve 22. The arm 35 is provided with an upwardly extending lug 37 in the path of the outer end of the stem arm 18, and is radially slotted as shown at 38 to receive a pin 39 which also extends through the forked end of a second member 40 of the handle mechanism. The member 40 is extended beyond its forked portion and internally threaded as indicated at 41 to receive the threaded end of a rod 42 which may be of any convenient length to operate the mechanism. The forked end of the member 40 carries an upwardly extending lug 43 which, when the pin 39 is at the inner end of the slot 38, is in the path of the stem arm 18, but when the pin 39 is at the outer end of said slot, clears the outer end of the stem arm 18. The operating position of the rod 42 is horizontal and with the pin 39 at the inner or outer end of the slot 38 depending upon the operation to be effected, the pin 39 at the same time permitting the rod 42 to rest adjacent the body 10, when it is not desired to operate the valve mechanism.

The sleeve 22 is preferably counterbored between its ends as shown at 44 and provided with a plurality of small ports 45 in line with an oiling or greasing fitting 46 carried by the yoke boss 23, so that the threads on the sleeve 22 as well as its bore may be lubricated as desired.

The bonnet 26 is provided in its upper portion with a stuffing box 47 terminated at its lower end by a metal ring 48 supported on a shoulder in the bore of the bonnet, and below the ring 48, the bonnet bore is continued to form a condensation chamber 49 above the part of the bore in the bonnet engaging the valve stem 15. Below the bonnet 26, the body 10 contains a second condensation chamber 50, the chambers 49 and 50 being effective in separating the stuffing box 47 from the zone of high temperature of the working fluid, due to the radiation effected by the valve body and by the lower portion of the bonnet. The chamber 49 is provided with a port 51 closed by a screw plug 52 so that the condition of the chamber 49 as to fluid pressure, may be tested when the valve member is in its tightly seated position, should it be desired to repack the stuffing box when the valve is in use. In the event the valve member 14 is not tightly against its seat, and fluid under high pressure is being controlled, the fluid will find its way into the chamber 50 and in turn into the chamber 49 and be in evidence when the plug 52 is removed, indicating that the valve member is not tightly on its seat and that it must be more firmly seated before the repacking of the stuffing box is begun.

The lower end of the valve member 14 is extended into a cylindrical portion 53 of reduced diameter, which has a turning fit in a corresponding bore in the lower part of the body 10, to form a bearing for the valve member 14 when it is raised from its seat. The body 10 is formed to leave a chamber 54 between the lower end of the valve member 14 and the adjacent portion of the body 10, the latter being extended below the cylindrical projection 53 to leave a chamber 55 which is closed by a cap 56 screwed on the lower end of the valve body, a screw plug 57 being provided in the cap 56 to drain the chamber 55 and to test the same for leakage around the lower part of the valve member.

As shown in Fig. 5, the valve member 14 is provided with a first port 58 connecting the chambers 50 and 54, and also with a second port 59 connecting the chambers 54 and 55, these ports being separate from and out of communication with the passageway for fluid flow through the valve member. In this manner the chambers 50, 54 and 55 are maintained at the same pressure and there is practically no resultant pressure tending to lift the valve member from its seat or force it to its seat. The ports 58 and 59 also permit drainage of condensate from the chamber 50 into the chambers 54 and 55.

In Fig. 3, I illustrate the different positions assumed by the handle mechanism as follows: in the position shown which is designated position C, the valve member is in its closed position and is raised from its seat to permit turning the valve member from its closed to its open position; in the position marked A, to which the handle mechanism may be moved without turning movement of the valve stem 15 and valve member 14, the valve member is pressed tightly against its seat; and in position B, the valve member is in its open position and raised from its seat to permit free movement of the valve member to its closed position. Assuming that the valve member is closed and tightly pressed against its seat, the stem arm 18 and pointer 19 are in position C and the handle mechanism is in position A. When it is desired to open the valve, the handle rod 42 is first raised to horizontal position and moved outwardly radially as far as it will go and then the handle mechanism is moved from position A to position C. This raises the valve member from its seat but as yet effects no turning of the valve member. Continued movement in the same direction of the handle mechanism, moves the lug 37 against the stem arm 18, so that during this continued movement the valve stem 15 and valve member 14 are moved with the handle mechanism from position C to position B, thus opening the valve member, but as yet leaving the valve member in its raised position slightly above its valve seat. Without changing the relation of the parts of the handle mechanism, the handle mechanism is now moved back from position B, through position C to position A, which leaves the stem arm 18 in position B since the handle lug 43 is out of the path of the end of the stem arm 18, and the turning movement imparted to the sleeve 22, presses the valve member 14 tightly against its seat in the body 10. When it is desired to move the valve member from its open position to its closed position, the handle mechanism is first placed in horizontal position with the rod 42 as far from the valve stem as possible, and the handle mechanism is moved from position A through position C to position B, this movement serving to lift the valve member from its seat but as yet effecting no turning movement of the valve member. When the handle mechanism has reached position B, the rod 42 is moved towards the valve stem as far as it will go, which brings the handle lug 43 into the path of the stem arm 18; the handle mechanism is then moved from position B to position C carrying with it the stem arm 18, the stem 15 and the valve member 14 and thus closing the valve which as yet is raised from its seat. Continued movement of the valve stem is prevented by the stop 31, and to press the valve member tightly against its seat, the rod 42 is moved outwardly as far as it can go and the handle mechanism is moved from position C to position A, which tightly presses the valve member against its seat. Position A is therefore the normal position for the handle mechanism, whether the valve is open or closed, and in its normal position, the handle rod may turn on the pin 39, adjacent the body 10, and occupy a minimum of space. In this manner, the operation of the mechanism is simple, the operator always has a positive indication of whether the valve is open or closed due to the position of the pointer 19, and the movement of the handle mechanism to its inner or outer position radially is indicated at once by the inter-engaging parts which are in plain view of the operator. Furthermore, however the mechanism may be operated, the valve member cannot be moved beyond its open or closed position on account of the stop 32 or 31 engaging one of the pillars 25, and since there is only one manner in which the handle mechanism can be operated to leave the stem arm 18 and pointer 19 either in open or closed position, confusion in operating the mechanism is impossible, having in mind that the position of rest of the handle mechanism is in every case position A. It will further be observed that there is no stop mechanism limiting the movement of the handle mechanism to position A, and that therefore this movement is continued until the valve member is tightly pressed against its seat, which permits a certain amount of change in the position of rest of the handle mechanism as conditions may require.

While I have shown my invention in the particular embodiment above described, it will be understood that I do not limit myself to this exact construction as I may employ equivalents known to the art at the time of the filing of this application without departing from the scope of the appended claims.

What I claim is:

1. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle, and said handle having a lug extending to engage said stem arm for the other direction of its turning movement.

2. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle, and said handle having a lug extending to engage said stem arm for the other direction of its turning movement, said handle connection providing for radial movement of said handle establishing a path of travel of said handle lug clear of said stem arm.

3. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle, and said handle having a lug extending to engage said stem arm for the other direction of its turning movement, said sleeve arm having a radial slot therethrough, and said handle connection comprising a pin extending through said handle and said slot.

4. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle and said handle having a lug extending to engage said stem arm for the other direction of its turning movement, said sleeve arm having a radial slot therethrough, and said handle connection comprising a pivot pin extending through said handle and said slot and providing for turning movement of said handle on said pin to rest adjacent said body when not in use.

5. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle, and said handle having a lug extending to engage said stem arm for the other direction of its turning movement, said sleeve arm having a radial slot therethrough, and said handle connection comprising a fork extending from the end of said handle on opposite sides of said sleeve arm, and a pin extending through said fork and said slot.

6. In a plug valve construction, the combination of a body having a tapered seat, a similarly tapered plug for engaging said seat and movable angularly to open and closed positions, a bonnet carried by said body, a yoke carried by and spaced from said bonnet, a stem extending from said plug through said bonnet and said yoke, a sleeve mounted for turning movement on said stem and having threaded engagement with said yoke, a stop arm on said stem between said bonnet and said yoke, a stem arm secured to said stem outside of said sleeve, said sleeve extending substantially from said stop arm to said stem arm, an operating arm secured to and extending from said sleeve, and a handle connected with said sleeve arm to turn said sleeve, whereby angular movement of said handle around the axis of said stem moves said stem axially relatively to said body to move said plug from and towards its seat as desired, said sleeve arm having a lug extending to engage said stem arm for one direction of turning movement of said handle, and said handle having a lug extending to engage said stem arm for the other direction of its turning movement, said sleeve arm having a radial slot therethrough, and said handle connection comprising a fork extending from the end of said handle on opposite sides of said sleeve arm, and a pivot pin extending through said fork and said slot and providing for turning movement of said handle on said pin to rest adjacent said body when not in use.

7. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle.

8. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by a single angular movement of said handle.

9. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle in either direction.

10. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle in one direction and axial movement of said plug by reversed angular movement of said handle.

11. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle, the total angle of movement of said handle including a first angle of movement lifting said plug from said seat and pressing it against said seat as desired and a second angle of movement imparting angular movement to said plug with said plug lifted from said seat.

12. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle, said members including selectively engaging elements, the selection being controlled by said radial movement of said handle.

13. In a plug valve construction, the combination of a body having a tapered plug seat, a plug movable angularly to control fluid flow through said body and movable axially from and towards said seat, a handle movable radially relatively to and angularly around the axis of said plug, and co-operating members between said handle and said plug for effecting both angular and axial movement of said plug by angular movement of said handle, the total angle of movement of said handle including a first angle of movement lifting said plug from said seat and pressing it against said seat as desired and a second angle of movement imparting angular movement to said plug with said plug lifted from said seat, said members including selectively engaging elements, the selection being controlled by said radial movement of said handle.

14. In a plug valve construction, the combination of a body having a tapered plug seat, a plug movable angularly to control fluid flow through said body and movable axially from and towards said seat, a handle movable radially relatively to and angularly around the axis of said plug, a stem extending from said plug, a threaded sleeve for imparting said axial movement to said plug and connected with said handle, and members carried by said stem, said sleeve and said handle and selectively engageable to effect angular and axial movements of said plug.

15. In a plug valve construction, the combination of a body having a tapered plug seat, a plug movable angularly to control fluid flow through said body and movable axially from and towards said seat, a handle movable radially relatively to and angularly around the axis of said plug, a stem extending from said plug, a threaded sleeve for imparting said axial movement to said plug and connected with said handle, first members carried by said sleeve and said stem imparting angular movement in a first direction to said plug for angular movement in a first direction of said handle, a second member carried by said handle for selective engagement with said stem member by said radial movement of said handle imparting when engaged angular movement in a reverse direction to said plug for angular movement in a reverse direction of said handle, the axial movement of said plug freeing it from and pressing it against said seat being independent of angular movement of said plug.

16. In a plug valve, the combination of a body having a tapered plug seat, a tapered plug having a passageway for fluid flow therethrough, and a stem extending from one end of said plug, said plug having a cylindrical bearing extension at its other end, said body having a bore engaging said cylindrical extension and containing a first compartment around said stem and adjacent one end of said plug, a second compartment around said cylindrical extension and adjacent the other end of said plug, and a third compartment at the end of said cylindrical extension, said plug having a first equalizing passageway independent of said fluid passageway and connecting said first and said second compartments, and a second equalizing passageway independent of said fluid passageway and connecting said second and said third compartments.

17. In a plug valve, the combination of a body having a tapered plug seat, a tapered plug having a passageway for fluid flow therethrough, a stem extending from one end of said plug, said plug having a cylindrical bearing extension at its other end, said body having a bore engaging said cylindrical extension and containing a first compartment around said stem and adjacent one end of said plug, a second compartment around said cylindrical extension and adjacent the other end of said plug, and a third compartment at the end of said cylindrical extension, said plug having a first equalizing passageway independent of said fluid passageway and connecting said first and said second compartments, and a second equalizing passageway and independent of said fluid passageway and connecting said second and said third compartments, a screw cap engaging said body and closing said third compartment, and means for draining said third compartment.

In witness whereof, I hereunto subscribe my name this 14th day of October, A. D. 1930.
WALTER W. MOHR.